(12) United States Patent
Maida

(10) Patent No.: US 6,907,907 B2
(45) Date of Patent: Jun. 21, 2005

(54) REMOVABLE PIPE VALVE INSULATION COVER

(76) Inventor: Dominic Maida, 2300 N. Dupont Hwy., New Castle, DE (US) 19720

( * ) Notice: Subject to any disclaimer, the term of this patent is extended or adjusted under 35 U.S.C. 154(b) by 0 days.

(21) Appl. No.: 10/607,793

(22) Filed: Jun. 27, 2003

(65) Prior Publication Data

US 2004/0261879 A1 Dec. 30, 2004

(51) Int. Cl.[7] ................................................. F16L 9/14
(52) U.S. Cl. ........................ 138/149; 138/167; 138/168; 138/169
(58) Field of Search ................................ 138/149, 167, 138/169, 168

(56) References Cited

U.S. PATENT DOCUMENTS

| | | | |
|---|---|---|---|
| 780,843 A | 1/1905 | Wallace | |
| 1,108,840 A | 8/1914 | Franke | |
| 2,778,405 A | 1/1957 | Stephens et al. | |
| 3,044,915 A | 7/1962 | Jacobsen | |
| 3,557,840 A | * 1/1971 | Maybee | 138/149 |
| 3,560,287 A | * 2/1971 | Helling | 156/218 |
| 3,724,491 A | 4/1973 | Knudsen et al. | |
| 4,009,735 A | 3/1977 | Pinsky | |
| 4,046,406 A | * 9/1977 | Press et al. | 285/47 |
| 4,112,967 A | 9/1978 | Withem | |
| 4,142,565 A | * 3/1979 | Plunkett, Sr. | 150/156 |
| 4,207,918 A | * 6/1980 | Burns et al. | 137/375 |
| 4,259,981 A | 4/1981 | Busse | |
| 4,556,082 A | * 12/1985 | Riley et al. | 137/375 |
| 4,696,324 A | * 9/1987 | Petronko | 137/375 |
| 4,791,236 A | * 12/1988 | Klein et al. | 174/36 |
| 4,807,669 A | * 2/1989 | Prestidge, Sr. | 138/178 |
| 4,930,543 A | * 6/1990 | Zuiches | 138/110 |
| 5,025,836 A | * 6/1991 | Botsolas | 138/110 |
| 5,027,862 A | * 7/1991 | Laybourn | 138/99 |
| 5,112,661 A | * 5/1992 | Pendergraft et al. | 428/36.91 |
| 5,158,114 A | * 10/1992 | Botsolas | 138/149 |
| 5,522,433 A | * 6/1996 | Nygaard | 138/149 |
| 5,713,394 A | * 2/1998 | Nygaard | 138/149 |
| 5,901,756 A | * 5/1999 | Goodrich | 138/167 |
| 5,941,287 A | * 8/1999 | Terito et al. | 138/149 |
| 5,967,194 A | * 10/1999 | Martin | 138/156 |
| 6,012,480 A | 1/2000 | Helmsderfer | |
| 6,019,136 A | * 2/2000 | Walsh et al. | 138/98 |
| 6,491,067 B1 | 12/2002 | Davenport et al. | |
| 2004/0103949 A1 | * 6/2004 | Rickards | 138/158 |

* cited by examiner

Primary Examiner—James Hook
(74) Attorney, Agent, or Firm—Connolly Bove Lodge & Hutz LLP

(57) ABSTRACT

In accordance with the present invention, a pipe insulation cover comprises a flexible planar and generally rectangular sheet having opposite long and short sides. Gathering structure is connected to each of the short sides, and releasably fastening structure is connected along each of the long sides of the flexible sheet. The long sides are releasably connected together after wrapping the sheet around pipe valve insulation, and the short sides are gathered around the pipe valve insulation by the gathering structure.

4 Claims, 2 Drawing Sheets

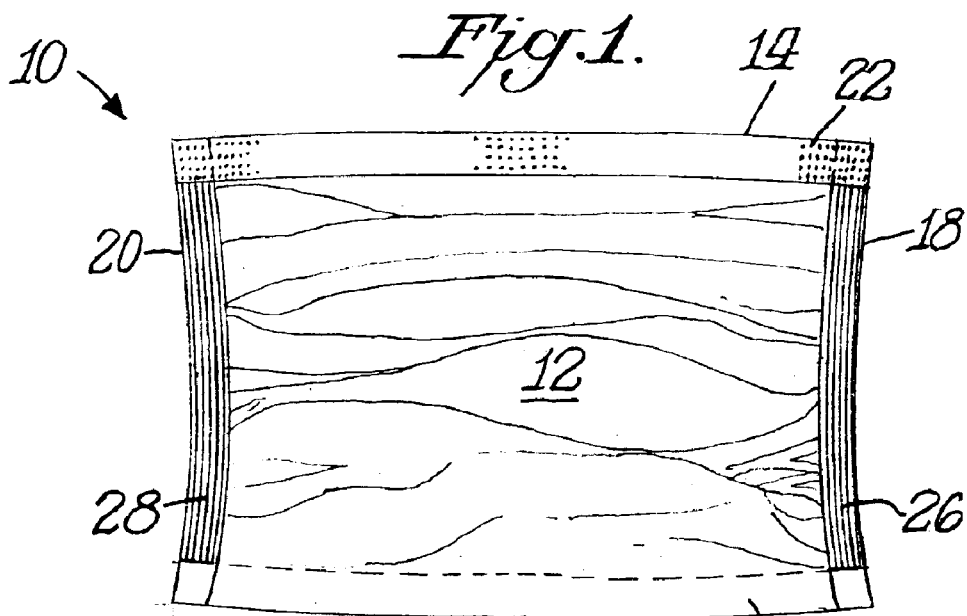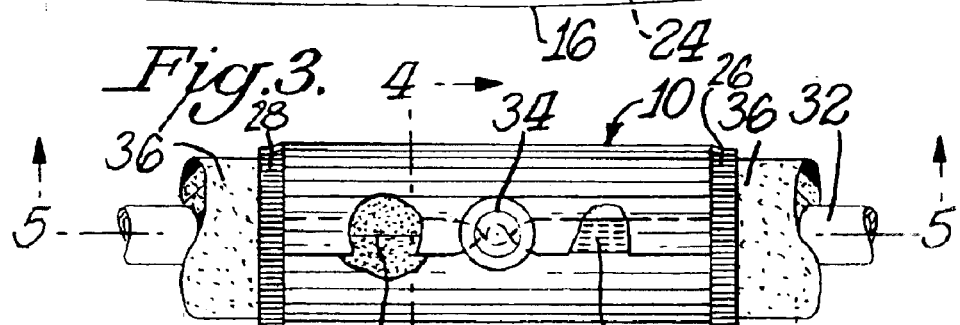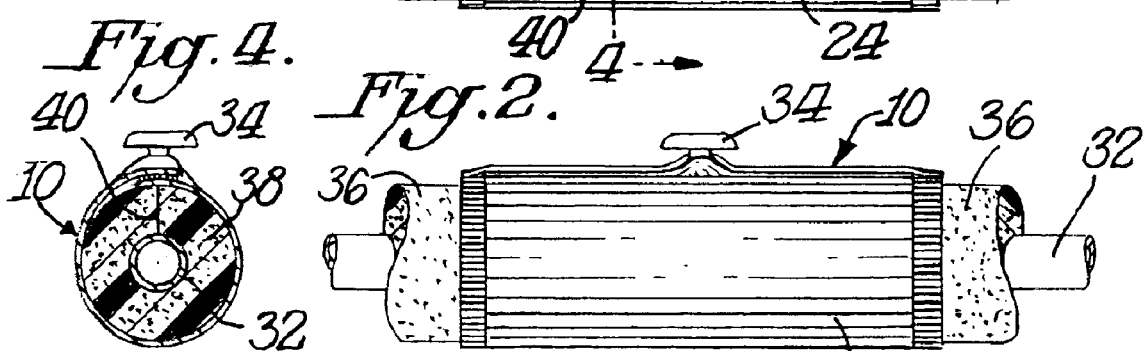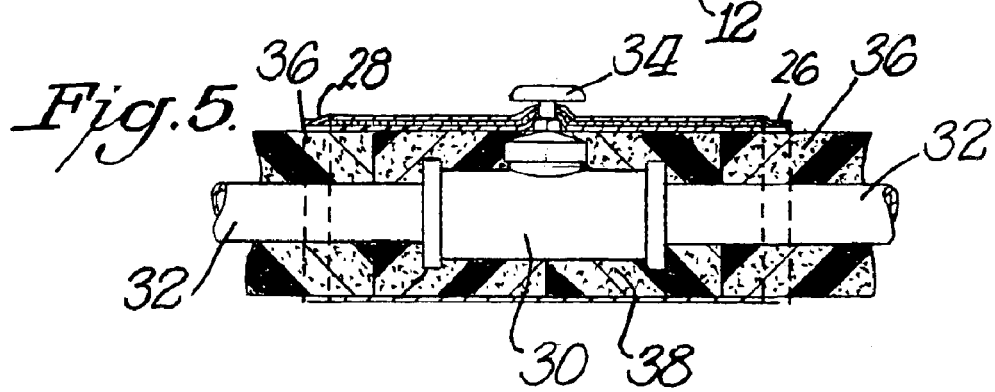

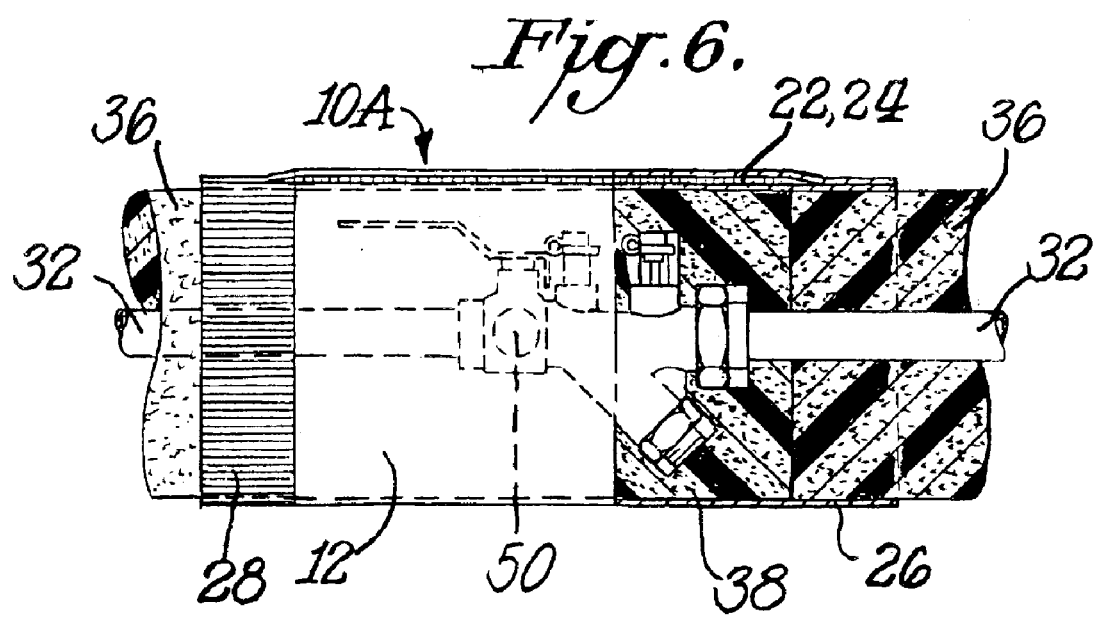

REMOVABLE PIPE VALVE INSULATION COVER

BACKGROUND OF THE INVENTION

The present invention relates to a pipe valve insulation cover that is easy to remove and reapply when access to the valve is required.

Insulation around pipe valves is often destroyed when access to such valves is necessary for valve maintenance, repairs and the like. Once the insulation is removed it is often difficult to replace and the technicians working on these valves simple move on without replacement of the insulation.

SUMMARY OF THE INVENTION

Accordingly, one of the objects of the present invention is a removable pipe valve insulation cover that effectively maintains insulation material around the valve while allowing easy removal and reapplication of the insulation and cover when access to the valve is required.

Another object of the present invention is a removable pipe valve insulation cover which is simple in design and easy to manufacture.

Still another object of the present invention is a removable pipe valve insulation cover which is uncomplicated to remove and reapply.

In accordance with the present invention, a pipe insulation cover comprises a flexible planar and generally rectangular sheet having opposite long and short sides. Gathering structure is connected to each of the short sides, and releasable fastening structure is connected along each of the long sides of the flexible sheet. The long sides are releasably connected together after wrapping the sheet around pipe valve insulation, and the short sides are gathered around the pipe valve insulation by the gathering structure.

Preferably, the gathering structure comprises a strip of elastic material secured along each of the short sides of the sheet. Moreover, the releasable fastening structure, preferably VELCRO hook and loop fasteners, includes a strip of hooks secured along one long side of the sheet and a strip of loops secured along the other side.

The pipe valve insulation cover of the present invention is utilized in combination with a pipe valve having removable insulation on the outside surfaces thereof. The flexible sheet is wrapped around the insulation and the long sides thereof are releasably secured together by the fastening structure, such as VELCRO hook and loop fasteners. Each of the short sides of the flexible sheet are gathered around the removable insulation by the gathering structure, such as the elastic strips.

BRIEF DESCRIPTION OF THE DRAWINGS

Novel features and advantages of the present invention in addition to those mentioned above will be readily apparent to persons of ordinary skill in the art from a reading of the following detailed description in conjunction with the accompanying drawings wherein similar reference characters refer to similar parts and in which:

FIG. 1 is a top plan view of a removable pipe valve insulation cover, according to the present invention;

FIG. 2 is a side elevational view of the removable pipe valve insulation cover of FIG. 1 holding insulation around a pipe valve, in accordance with the present invention;

FIG. 3 is a top plan view of a removable pipe valve insulation cover shown in FIGS. 1 and 2 with portions broken away to illustrate internal features, according to the present invention;

FIG. 4 is a cross-sectional view taken along line 4—4 of FIG. 3;

FIG. 5 is a longitudinal cross-sectional view taken along line 5—5 of FIG. 3; and FIG. 6 is a side elevational view of a removable pipe valve insulation cover holding insulation around a ball valve, with portions broken away to show interior details, according to the present invention.

DETAILED DESCRIPTION OF THE INVENTION

Referring in more particularity to the drawing, FIG. 1 shows a pipe valve insulation cover 10 comprising a flexible planar and generally rectangular sheet 12. The sheet has opposite long sides 14, 16 as well as opposite short sides 18, 20. Releasable fastening structure 22, 24 is connected along the long sides 14, 16, and gathering structure 26, 28 is connected to each of the short sides 18, 20. The sheet 12 may be fabricated from Teflon material, for example.

As explained more fully below the long sides 14, 16 are releasably connected together after wrapping the flexible sheet 12 around pipe valve insulation, and the short sides 18, 20 are gathered around the pipe valve insulation by the gathering structure 26, 28.

Preferably the gathering structure 26, 28 comprises strips of elastic material secured along each of the short sides 18, 20 of the flexible sheet 12, as shown best in FIG. 1. Additionally, the releasable fastening structure 22, 24 comprises VELCRO fasteners with a strip of hooks 22 secured along long side 14 and a strip of loops 24 secured along long side 16. The hooks are positioned on one side of the sheet 12 and the loops are positioned on the other side.

The pipe valve insulation cover 10 of the present invention is used in combination with a pipe valve, such as gate valve 30 connected to pipe or tubing 32, as shown best in FIG. 5. Valve 30 is illustrated as a simple in-line gate valve having a handle 34, but other valve configurations may also be utilized in combination with the insulation cover 10. Essentially insulation material 36 surrounds the pipe 32 while similar insulation 38 surrounds the pipe valve 30. The insulation may include a radial seam 40 to facilitate wrapping insulation 36 and 38 around the pipes 32 and valve 30.

With the pipe valve insulation 38 in place around the valve 30, the insulation cover 12 is simply wrapped around insulation 38 and secured together by the interaction between the strip of hooks 22 on long side 14 and the strip of loops 24 on the opposite long side 16. The elastic strips 26, 28 along the short sides 18, 20 gather the flexible sheet 12 of cover 10 around the insulation 36, 38, as shown best in FIG. 5.

The pipe valve insulation cover 10 of the present invention functions to maintain the insulation 38 around the pipe valve 30 at all times. However, when adjustment and/or other servicing of valve 30 is required both the cover 10 and the insulation 38 are easily removed from their positions around valve 30. Upon completion of such service, the insulation 38 is simply positioned around the pipe valve, and the cover is then wrapped around the insulation, as described above. The cover tightly surrounds the insulation by way of the long sides thereof being releasably secured together by the fastening structure 22, 24 while the short sides 18, 20 gather around the insulation 38 via the elastic strips 26, 28.

FIG. 6 illustrates a pipe valve insulation cover 10A releasably secured in place around a ball valve 50. Otherwise the cover 10A functions in the same manner as cover 10. Basically, the pipe valve insulation cover 10A functions to maintain the insulation 38 around the ball valve 50 until adjustment and/or other servicing of the valve is required. Then the cover 10A and the insulation 38 are easily removed from their positions around valve 50. After completion of such service, the insulation 38 is simply positioned around the pipe valve 50, and the cover is wrapped round the insulation as described above.

What is claimed is:

1. A pipe valve insulation cover in combination with a pipe valve and separate and removable insulation on outside surfaces of the pipe valve, the insulation cover comprising a unitary flexible planar and generally imperforate sheet having opposite long and short side edge portions, a strip of elastic material secured along each of the short side edge portions of the sheet, and releasable fastening structure along each of the long side edge portions, and wherein the flexible imperforate sheet is wrapped around the separate and removable insulation on outside surfaces of the pipe valve, and the long side edge portions are releasably secured together by the fastening structure with each of the short side edge portions gathered around the separate and removable insulation by the strips of elastic material secured along each of the short side edge portions of the flexible imperforate sheet.

2. The combination of claim 1 wherein the releasable fastening structure comprises a strip of hooks secured along one long side edge portion of the sheet and a strip of loops secured along the other side edge portion thereof, and wherein the hooks and loops engage one another.

3. The combination of claim 1 wherein the valve is a gate valve.

4. The combination of claim 1 wherein the valve is a ball valve.

\* \* \* \* \*